United States Patent
Sato

(10) Patent No.: US 12,291,044 B2
(45) Date of Patent: May 6, 2025

(54) TRANSPORT DEVICE AND LIQUID EJECTING DEVICE

(71) Applicant: SEIKO EPSON CORPORATION, Tokyo (JP)

(72) Inventor: Koji Sato, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 157 days.

(21) Appl. No.: 18/153,510

(22) Filed: Jan. 12, 2023

(65) Prior Publication Data
US 2023/0226835 A1    Jul. 20, 2023

(30) Foreign Application Priority Data

Jan. 14, 2022 (JP) ................. 2022-004200

(51) Int. Cl.
| | | |
|---|---|---|
| *B41J 29/17* | (2006.01) | |
| *B41J 11/00* | (2006.01) | |
| *B65G 45/16* | (2006.01) | |
| *B65H 5/02* | (2006.01) | |

(52) U.S. Cl.
CPC ............ *B41J 29/17* (2013.01); *B41J 11/007* (2013.01); *B65G 45/16* (2013.01); *B65H 5/021* (2013.01); *B65H 2301/531* (2013.01)

(58) Field of Classification Search
CPC .......... B41J 29/17; B41J 11/007; B41J 13/08; B65G 45/16; B65G 45/24; B65H 5/021; B65H 2301/531; B65H 2801/06
See application file for complete search history.

(56) References Cited

FOREIGN PATENT DOCUMENTS

| | | | |
|---|---|---|---|
| JP | 2012-116619 A | 6/2012 | |
| WO | WO-2016208177 A1 * | 12/2016 | ............... B08B 1/02 |

OTHER PUBLICATIONS

Jingushi Masaru, Liquid Ejecting Apparatus, and Cleaning Method of Transport Belt of Liquid Ejecting Apparatus (WO 2016208177 A1), Dec. 19, 2016, [Paragraphs 0018-0019, 0035-0040]. (Year: 2016).*

* cited by examiner

*Primary Examiner* — Lisa Solomon
(74) *Attorney, Agent, or Firm* — WORKMAN NYDEGGER

(57) ABSTRACT

A transport device includes a transporting belt including an outer peripheral surface where a medium is placeable, the transporting belt being configured to transport the medium, a wiper blade including a tip portion configured to come into contact with the outer peripheral surface, and a base end portion located on an opposite side of the tip portion in an intersecting direction intersecting with the outer peripheral surface, the wiper blade being configured to wipe the outer peripheral surface, a contact portion made of resin and configured to support the base end portion by coming into contact with the base end portion, and a plurality of pressing units provided side by side in a width direction of the transporting belt, the plurality of pressing units being configured to press the base end portion via the contact portion.

7 Claims, 9 Drawing Sheets

TRANSPORT DEVICE AND LIQUID EJECTING DEVICE

The present application is based on, and claims priority from JP Application Serial Number 2022-004200, filed Jan. 14, 2022, the disclosure of which is hereby incorporated by reference herein in its entirety.

BACKGROUND

1. Technical Field

The present disclosure relates to a transport device and a liquid ejecting device.

2. Related Art

A recording medium transport device described in JP-A-2012-116619 includes an endless belt for transporting a recording medium, a cleaning liquid adhering unit for allowing a cleaning liquid to adhere to a surface of the endless belt and cleaning the surface, and a plurality of blades. The plurality of blades are in contact with the surface of the endless belt at positions downstream in the moving direction of the endless belt from a position where the cleaning liquid is made to adhere by the cleaning liquid adhering unit, and remove the cleaning liquid adhering to the surface of the endless belt.

In the recording medium transport device described in JP-A-2012-116619, when a gap is formed between the blades and the endless belt due to variation in the heights of the blades, the cleaning liquid may remain on the endless belt. Thus, it is required to adjust the heights of the blades so as to form no gap between the blades and the endless belt. Further, when the blades are undulated, no gap may be formed between some of the blades and the endless belt, but a gap may be formed between the others of the blades and the endless belt. Thus, the heights of the blades are preferably adjusted so that no gap is formed between individual parts of the blades and the endless belt. However, in the recording medium transport device described in JP-A-2012-116619, even though the heights of the entire blades can be adjusted, it is difficult to adjust the heights of individual parts of the blades.

SUMMARY

A transport device for solving the above problem is a transport device including a transporting belt including an outer peripheral surface where a medium is placeable, the transporting belt being configured to transport the medium, a wiper blade including a tip portion configured to come into contact with the outer peripheral surface, and a base end portion located on an opposite side of the tip portion in an intersecting direction intersecting with the outer peripheral surface, the wiper blade being configured to wipe the outer peripheral surface, a contact portion made of resin and configured to support the base end portion by coming into contact with the base end portion, and a plurality of pressing units provided side by side in a width direction of the transporting belt, the plurality of pressing units being configured to press the base end portion via the contact portion.

A liquid ejecting device for solving the above problem is a liquid ejecting device including an ejecting unit configured to eject a liquid to a medium, a transporting belt including an outer peripheral surface where a medium is placeable, the transporting belt being configured to transport the medium, a wiper blade including a tip portion configured to come into contact with the outer peripheral surface, and a base end portion located on an opposite side of the tip portion in an intersecting direction intersecting with the outer peripheral surface, the wiper blade being configured to wipe the outer peripheral surface, a contact portion made of resin and configured to support the base end portion by coming into contact with the base end portion, and a plurality of pressing units provided side by side in a width direction of the transporting belt, the plurality of pressing units being configured to press the base end portion via the contact portion.

DESCRIPTION OF EXEMPLARY EMBODIMENTS

Figure 1:
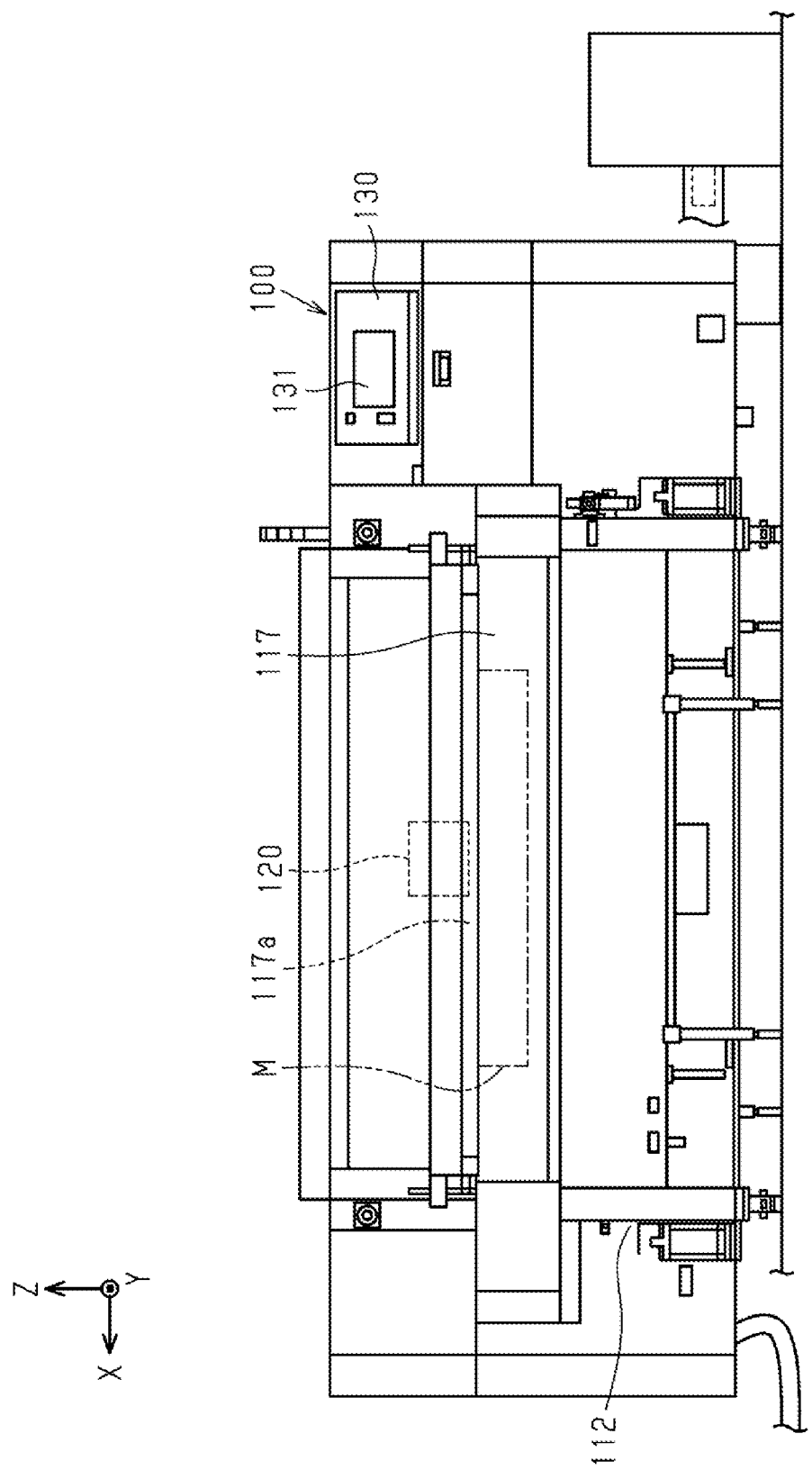
FIG. 1 is a front view illustrating a printing apparatus according to an embodiment.

A liquid ejecting device according to an embodiment will be described below with reference to the drawings. In the drawings, assuming that a printing apparatus 100 is placed on a horizontal plane, a direction of gravity is indicated by a Z-axis, and directions along the horizontal plane are indicated by an X-axis and a Y-axis. The X-axis, the Y-axis, and the Z-axis are mutually orthogonal. In the following description, a direction along the X-axis is also referred to as a width direction X, a direction along the Y-axis is also referred to as a depth direction Y, and a direction along the Z-axis direction is also referred to as a gravity direction Z. The X-axis is an imaginary axis parallel to the width direction X of a transporting belt described later, and the Y-axis is an imaginary axis parallel to a transport direction Y of a medium M on the transporting belt. At this time, when the left and the right of the width direction of the printing apparatus 100 are distinguished, the left is referred to as a +X direction, and the right is referred to as a −X direction. When the frontward direction and the rearward direction of the depth direction of the printing apparatus 100 are distinguished, the frontward direction is referred to as a +Y direction, and the rearward direction is referred to as a −Y direction. When the upward direction and the downward direction of the height direction of the printing apparatus 100 are distinguished, the upward direction is referred to as a +Z direction, and the downward direction is referred to as a −Z direction.

Configuration of Printing Apparatus 100

As illustrated in FIG. 1, the printing apparatus 100 as an example of the liquid ejecting device includes a transporting belt 117 and an ejecting unit 120. The transporting belt 117 supports and transports the medium M such as fabric or paper on the support face 117a. The ejecting unit 120 performs a printing operation by ejecting a liquid on the medium M supported by the transporting belt 117. The printing apparatus 100 includes a housing 112 having a column-beam structure and an operation unit 130. The operation unit 130 is operated by a user and includes, for example, a display unit 131 implemented by a touch panel liquid crystal screen or the like, and an operation button.

Figure 2:
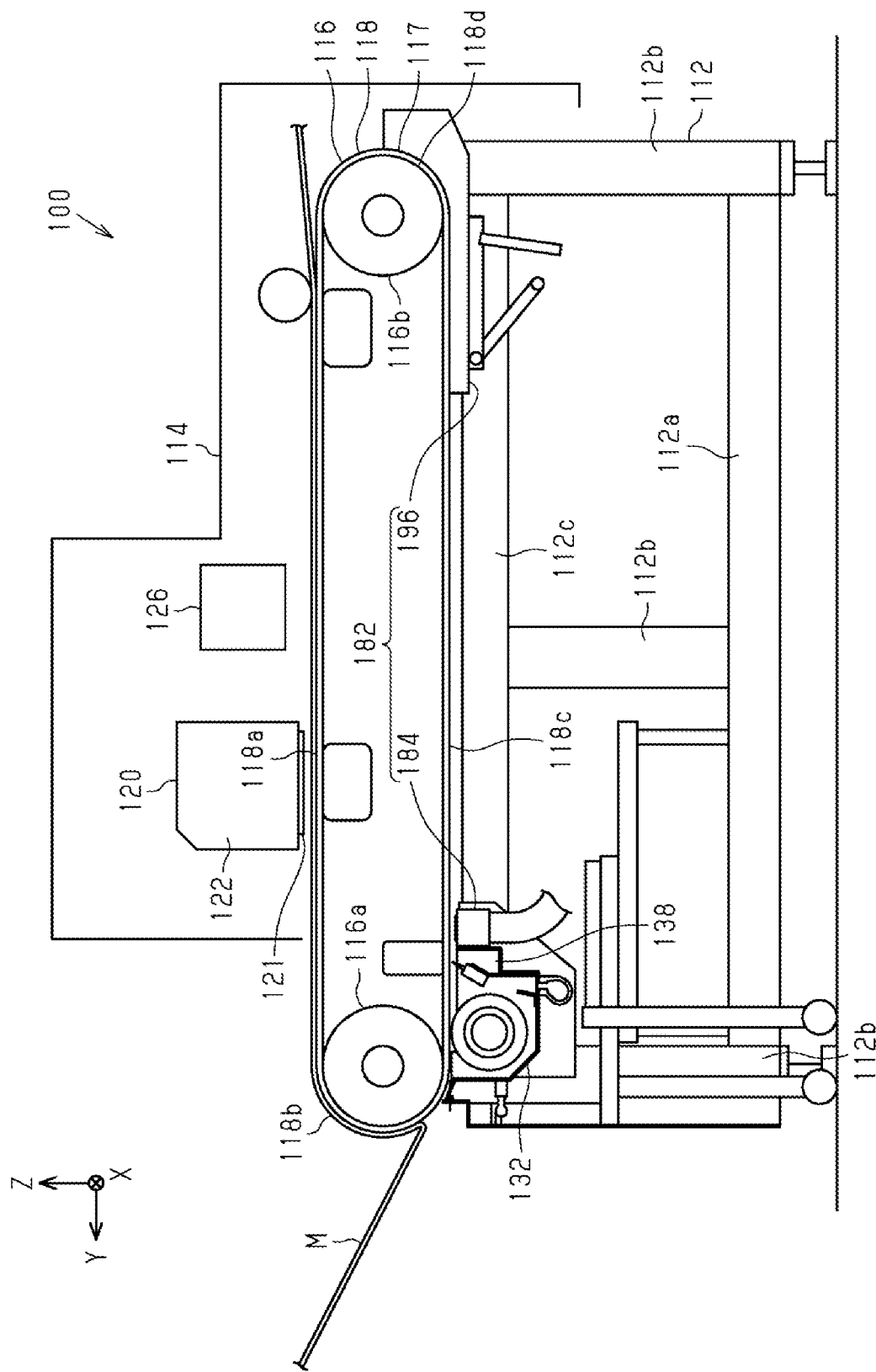
FIG. 2 is a side cross-sectional view illustrating an internal structure of the printing apparatus.

As illustrated in FIG. 2, the printing apparatus 100 includes a cover 114, a transport device 116 that transports the medium M by the transporting belt 117, a control unit 126, a cleaning unit 132, and a drying unit 182.

The housing 112 is configured as a base portion at which each portion of the printing apparatus 100 is provided. The housing 112 has a column-beam structure including a bottom frame 112a, a column frame 112b and a top frame 112c. The cover 114 is an outer packaging member that covers each portion of the printing apparatus 100.

As illustrated in FIG. 2, the transport device 116 is provided at an upper part of the housing 112 and includes a driving roller 116a, a driven roller 116b, the transporting belt 117, and a winding roller (not illustrated). The transport device 116 can transport the medium M in the +Y direction with movement of the transporting belt 117 by rotation of the driving roller 116a. The driving roller 116a is disposed downstream and the driven roller 116b is disposed upstream in the +Y direction. In addition, both the driving roller 116a and the driven roller 116b each include a rotation shaft extending along the X direction. The transport device 116 is controlled by the control unit 126 described later.

The transporting belt 117 is configured as an endless belt obtained by joining both ends of elastic planar plates. The transporting belt 117 is wound around an outer circumferential surface of the driving roller 116a and an outer circumferential surface of the driven roller 116b. In other words, the transporting belt 117 is provided at the housing 112 and moves in a circular manner, thereby enabling transportation of the medium M.

The transporting belt 117 may be, for example, a glue belt. In a case where the transporting belt 117 is a glue belt, an outer peripheral surface 118 of the transporting belt 117 has, for example, adhesiveness, and the medium M can be placed on and stuck to the outer peripheral surface 118. The term "adhesiveness" refers to a property in which a member can be temporarily bonded to another member and the member in a bonded state can be peeled off.

On the outer peripheral surface 118, a direction intersecting with the +Y direction, which is the moving direction of the transporting belt 117, is the X direction. A portion of the outer peripheral surface 118 that is positioned in the +Z direction with respect to the center of the driving roller 116a and is along the XY plane is referred to as an upper surface portion 118a. The upper surface portion 118a supports the medium M. In addition, a portion of the outer peripheral surface 118 wound around the driving roller 116a is referred to as a curved surface portion 118b. Further, a portion of the outer peripheral surface 118 that is positioned in the −Z direction with respect to the center of the driving roller 116a and is along the XY plane is referred to as a lower surface portion 118c. In addition, a portion wound around the driven roller 116b is referred to as a curved surface portion 118d.

The transport device 116 can change the transport speed of the medium M by adjusting the number of rotations per unit time of the driving roller 116a. A winding roller (not illustrated) winds the medium M, and thus the medium M is peeled off from the curved surface portion 118b.

As illustrated in FIG. 2, the ejecting unit 120 is provided above the transport device 116. The ejecting unit 120 is configured to be capable of performing recording on the medium M transported in the +Y direction. The ejecting unit 120 includes an ejecting head 121 and a carriage 122 that supports the ejecting head 121 such that the ejecting head 121 can reciprocate along the X direction. The ejecting head 121 is disposed in the +Z direction with respect to the medium M and performs recording on the medium M by ejecting ink, which is an example of a liquid, on a recording surface of the medium M. The ejecting unit 120 is controlled by the control unit 126.

The control unit 126 includes a central processing unit (CPU) and a memory, which are not illustrated. The CPU is an arithmetic processing device. The memory is a storage device that allocates a region for storing a program for the CPU, a working region, or the like, and includes a storage element, a storage, and the like, such as a random access memory (RAM) or an electrically erasable programmable read only memory (EEPROM). The CPU controls an operation of each portion of the printing apparatus 100 in accordance with the program stored in the memory.

The cleaning unit 132 cleans the outer peripheral surface 118 of the transporting belt 117. The cleaning unit 132 is disposed in the −Z direction with respect to an end portion of the lower surface portion 118c in the +Y direction. The cleaning unit 132 is controlled by the control unit 126. The details of the cleaning unit 132 will be described later.

The drying unit 182 dries the outer peripheral surface 118 cleaned by the cleaning unit 132. The drying unit 182 includes, for example, a blowing unit 184 that blows air toward the outer peripheral surface 118 and a heating unit 196 that heats the outer peripheral surface 118. The blowing unit 184 is disposed, adjacent to the cleaning unit 132, at a position in the −Y direction with respect to the cleaning unit 132. The heating unit 196 is disposed in the −Z direction with respect to an end portion of the lower surface portion 118c in the −Y direction. The drying unit 182 is controlled by the control unit 126.

Figure 3:
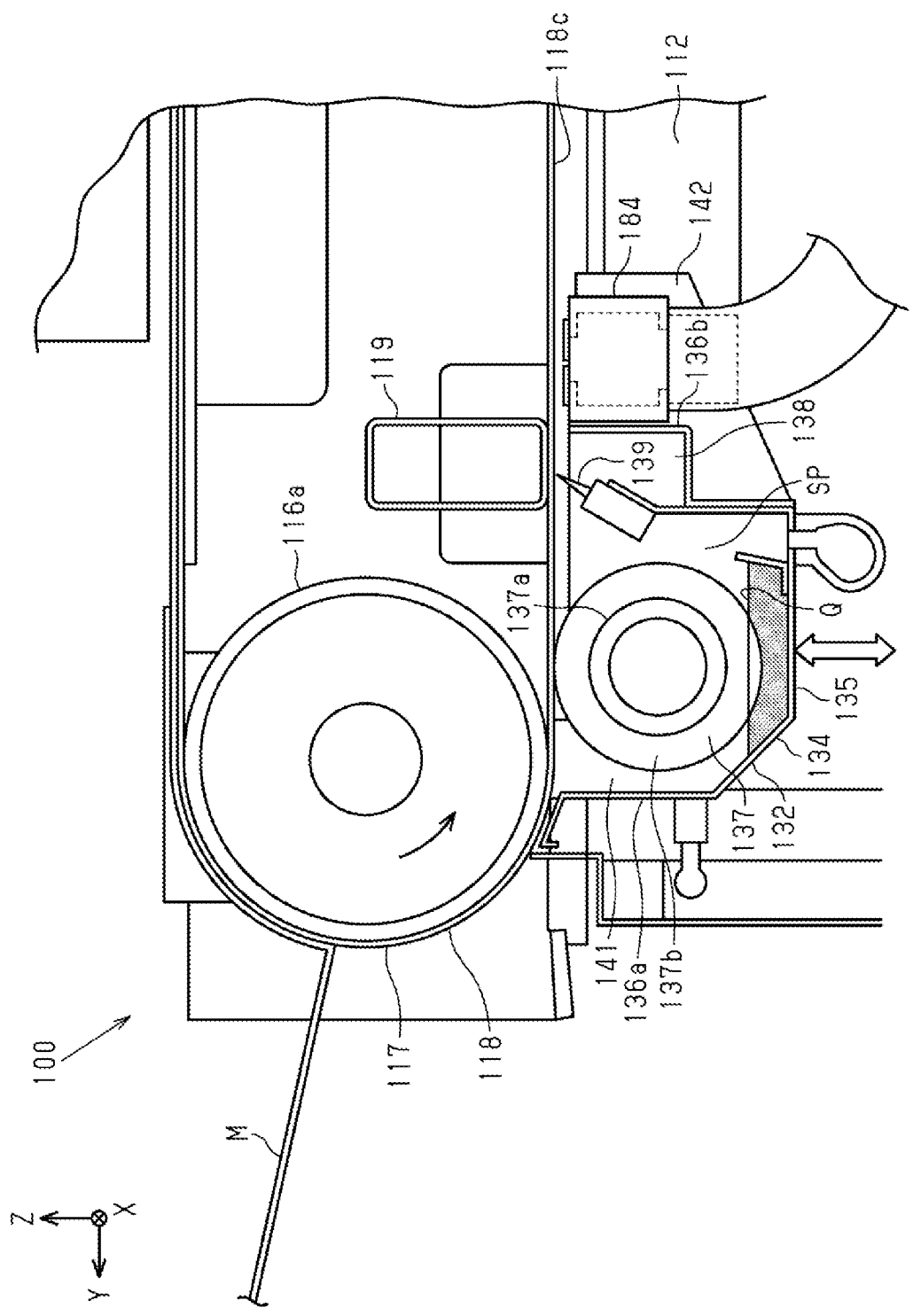
FIG. 3 is a side cross-sectional view illustrating a cleaning unit of the printing apparatus.

As illustrated in FIG. 3, the cleaning unit 132 includes a storage tank 134 that stores a cleaning liquid Q, a cleaning brush 137, and a wiper blade 139. The cleaning unit 132 can be raised and lowered by using an air cylinder (not illustrated) in the Z direction with respect to the transporting belt 117 to be cleaned.

The ejecting unit 120 performs recording on the medium M, which may cause a liquid to adhere to the outer peripheral surface 118 of the transporting belt 117. For example, in a case where the medium M is cloth, a liquid such as ink bled through the cloth may adhere to the outer peripheral surface 118. In addition, when the medium M is peeled off from the outer peripheral surface 118, waste of the cloth may remain on the outer peripheral surface 118. The liquid such as ink adhering to the outer peripheral surface 118 becomes a cause of staining the medium M, and the waste remaining on the outer peripheral surface 118 becomes a cause of reducing the adhesive force of the medium M to the outer peripheral surface 118. In the cleaning unit 132, the cleaning brush 137 cleans the outer peripheral surface 118 of the transporting belt 117 in order to remove the liquid adhering to the outer peripheral surface 118 and the waste caused by the medium base material.

The storage tank 134 is disposed below the driving roller 116a and the transporting belt 117. The storage tank 134 includes a bottom wall 135, a front wall 136a, a rear wall 136b, and a pair of side walls 138. The bottom wall 135 is formed in a quadrangular plate shape having a predetermined thickness in the Z direction, and is disposed along the XY plane. The front wall 136a is erected upright in the +Z direction at an end portion of the bottom wall 135 in the +Y direction. The rear wall 136b is erected upright in the +Z direction at an end portion of the bottom wall 135 in the −Y direction. One of the pair of side walls 138 is disposed at an end portion of the bottom wall 135 in the +X direction, and the other is disposed at an end portion of the bottom wall 135 in the −X direction. The pair of side walls 138 are elected upright in the +Z direction from the bottom wall 135. That is, the storage tank 134 has a box shape with an open top. The cleaning liquid Q for cleaning the outer peripheral surface 118 is stored in a space SP that is inside the box shape and that is surrounded by the bottom wall 135, the front wall 136a, the rear wall 136b, and the pair of side walls 138. That is, the storage tank 134 stores, inside the box shape with the open top, the cleaning liquid Q to be supplied to the cleaning brush 137 at the time of the cleaning operation.

The side walls 138 extend in the −Y direction beyond the rear wall 136b when viewed from the X direction. That is, the side walls 138 each include a side wall portion 141 that forms the space SP, and an extending portion 142 that extends from the side wall portion 141 in the −Y direction and is located outside the space SP. The extending portion 142 supports the blowing unit 184. That is, the blowing unit 184 is supported by the cleaning unit 132.

The cleaning brush 137 includes a cylindrical shaft portion 137a and a brush portion 137b radially extending from an outer cylindrical surface of the shaft portion 137a. The shaft portion 137a extends in the X direction and is rotatably supported at parts of the side walls 138.

The brush portion 137b is configured to be capable of being in contact with the lower surface portion 118c. The cleaning brush 137 is rotated by a motor (not illustrated) to remove the liquid adhering to the lower surface portion 118c and the waste caused by the medium base material with the cleaning liquid Q stored in the storage tank 134. That is, the cleaning brush 137 performs a cleaning operation of the transporting belt 117 using the cleaning liquid Q stored in the storage tank 134. The liquid and the waste caused by the medium base material, which are removed from the transporting belt 117 by the cleaning brush 137, are mixed into the cleaning liquid Q in the storage tank 134 and collected.

Figure 4:
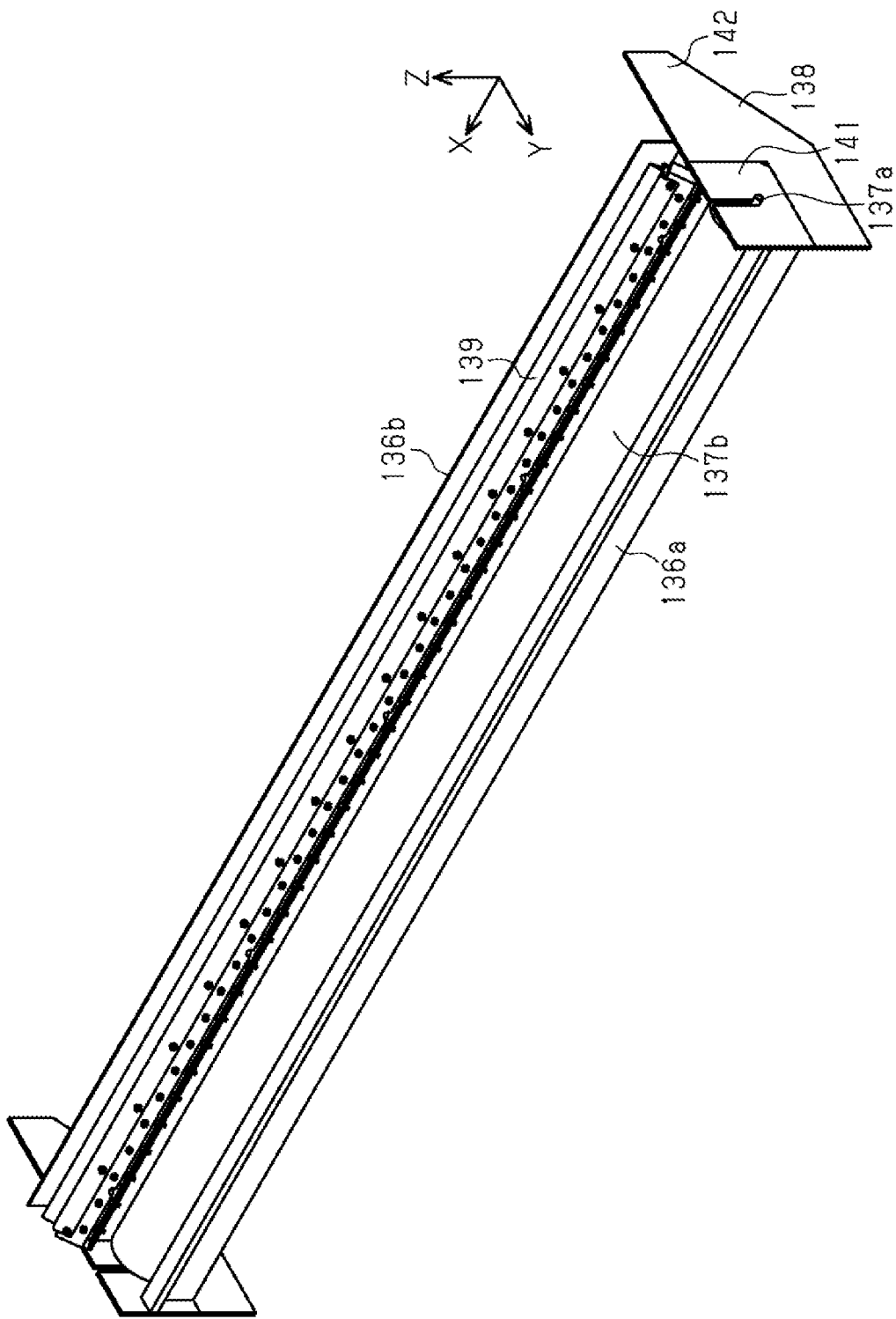
FIG. 4 is a perspective view illustrating a processing device.

As illustrated in FIG. 4, the cleaning brush 137 and the wiper blade 139 are provided over the printing apparatus 100 in the X direction. The length of the wiper blade 139 in the X direction is slightly longer than the length of the cleaning brush 137 in the X direction. Thus, the wiper blade 139 scrapes off, from the lower surface portion 118c, the cleaning liquid Q and the like remaining on the lower surface portion 118c after cleaning by the cleaning brush 137.

Figure 5:
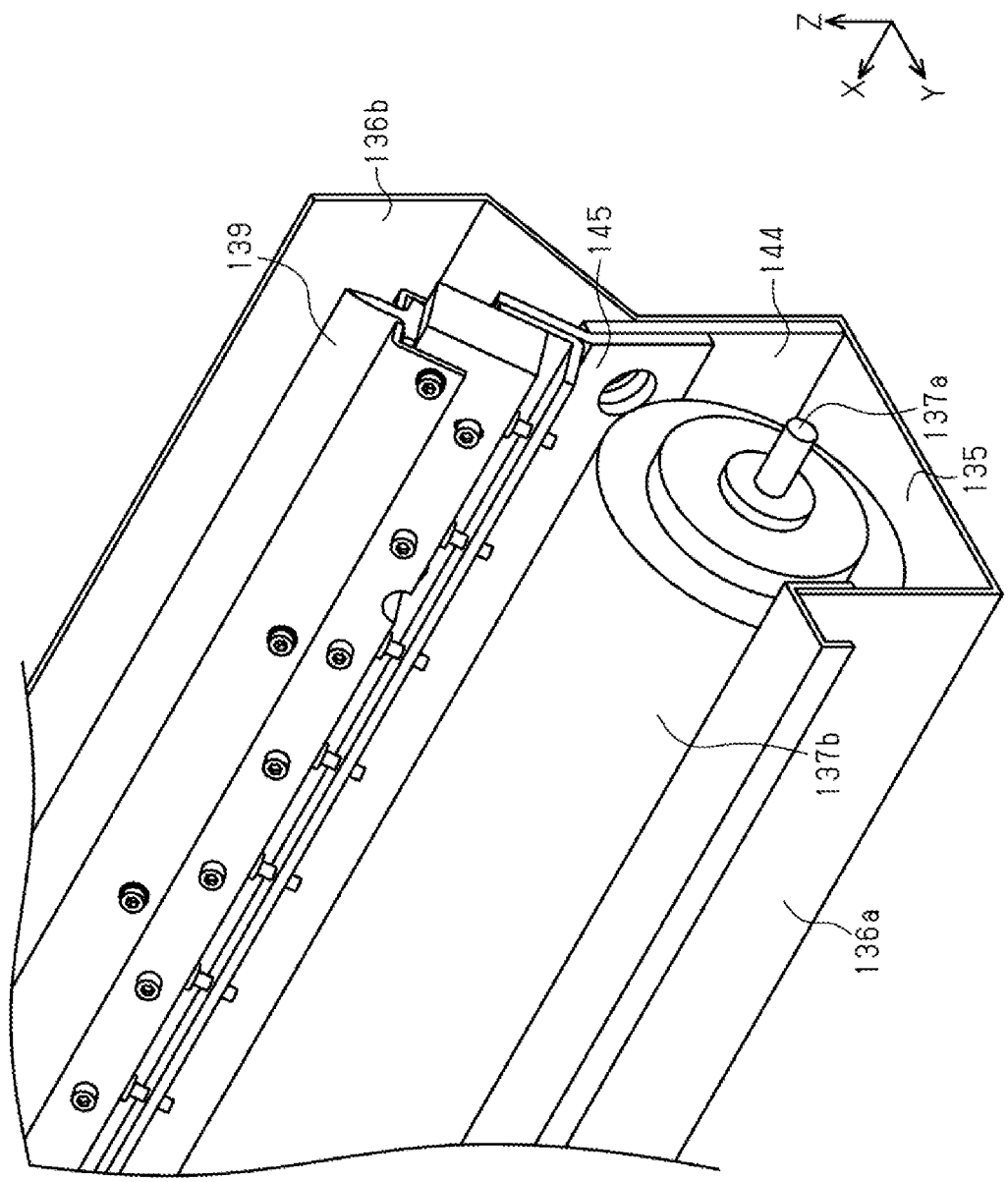
FIG. 5 is a perspective view illustrating a part of a wiper blade.

As illustrated in FIG. 5, the wiper blade 139 is attached to a second plate member 145 supported by a first plate member 144 extending in the +Z direction from a part of the rear wall 136b. The wiper blade 139 scrapes off, from the lower surface portion 118c, the cleaning liquid Q and the like remaining on the lower surface portion 118c after cleaning by the cleaning brush 137. The center of the second plate member 145 is inclined at a predetermined angle toward the −Y direction. Due to this angle, the wiper blade 139 is also inclined with respect to the lower surface portion 118c, and the wiper blade 139 can suitably scrape off the cleaning liquid Q and the like remaining on the lower surface portion 118c.

As illustrated in FIG. 3, an inner frame 119 is provided inside the transporting belt 117 at a part in contact with a tip portion of the wiper blade 139. The inner frame 119 is installed across the housing 112 in the X direction and supports the transporting belt 117 from the inside. Thus, the transporting belt 117 can resist a pressing force from the wiper blade 139.

Figure 6:
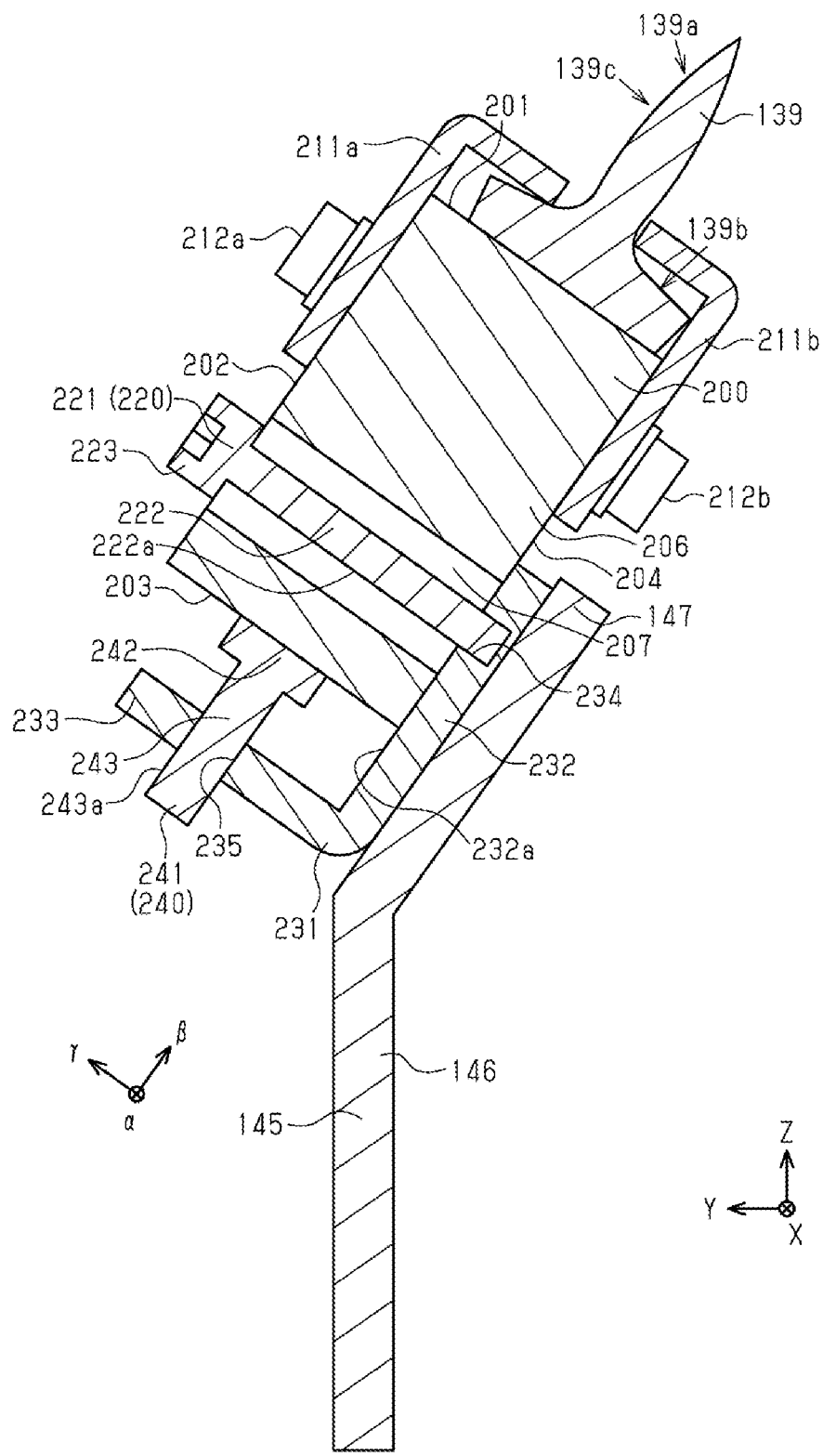
FIG. 6 is a side cross-sectional view illustrating a structure for supporting the wiper blade.

Hereinafter, a configuration for supporting the wiper blade 139 will be described in detail. As illustrated in FIG. 6, a first portion 146 and a second portion 147 are formed in the second plate member 145 by bending a plate material. The first portion 146 is provided along the first plate member 144. The second portion 147 protrudes in the +Z direction of the first plate member 144 and is inclined rearward toward the −Y direction. The wiper blade 139 and a configuration for supporting the wiper blade 139 are provided on a surface of the second portion 147 in the +Z direction.

In the drawing, directions along the surface of the second portion 147 in the +Z direction are indicated by an α-axis and a β-axis, and an axis orthogonal to the α-β plane is indicated by a γ-axis. The α-axis, the β-axis, and the γ-axis are mutually orthogonal. The α-axis and the X-axis are substantially parallel to each other. In the following description, a direction along the α-axis is also referred to as a width direction α, a direction along the β-axis is also referred to as a blade extending direction β since this is also an extending direction of the wiper blade 139, and a direction along the γ-axis is also referred to as a vertical direction γ. At this time, when the left and the right of the width direction α are distinguished, the left is referred to as a +α direction, and the right is referred to as a −α direction. When the frontward direction and the rearward direction of the depth direction β are distinguished, the frontward direction is referred to as a −β direction, and the rearward direction is referred to as a +β direction. When the upward direction and the downward direction of the vertical direction γ are distinguished, the upward direction is referred to as a +γ direction, and the downward direction is referred to as a −γ direction.

A support portion 231 is provided on the surface of the second portion 147. The support portion 231 is configured to be bent, for example, at a right angle toward the +γ direction, thereby forming a support face portion 232 and an upright portion 233. The support portion 231 includes a support face 232a on the surface of the support face portion 232 in the +γ direction. The support face 232a is, for example, a surface parallel to the surface of the second portion 147 in the +Z direction. A contact portion 200 is provided on the support face 232a over the printing apparatus 100 in the X direction (that is, the α direction).

For example, the contact portion 200 is made of resin and has a rectangular parallelepiped outer shape having long sides in the α direction when viewed from the +γ direction. Specifically, the contact portion 200 includes a first surface 201 in the +β direction, a second surface 202 in the +γ direction, a third surface 203 in the −β direction, a fourth surface 204 in the −γ direction, a fifth surface 205 in the +α direction, and a sixth surface 206 in the −α direction. Thus, the support face 232a comes into contact with the fourth surface 204 of the contact portion 200 and supports the contact portion 200 in a displaceable manner.

The first surface 201 of the contact portion 200 comes into contact with the wiper blade 139. The wiper blade 139 includes a tip portion 139a and a base end portion 139b. The wiper blade 139 includes a blade portion 139c formed thinly in the γ direction so as to be easily bent when receiving an external force, and the base end portion 139b formed more thickly in the γ direction than the blade portion 139c. A portion between the blade portion 139c and the base end portion 139b has a constricted shape. The blade portion 139c extends in the +β direction from the base end portion 139b. The blade portion 139c is formed such that the tip portion 139a, which is an end portion in the +β direction, is thinnest. The tip portion 139a is a portion of the wiper blade 139 capable of being in contact with the outer peripheral surface 118. The base end portion 139b is located on an opposite side of the tip portion 139a in an intersecting direction intersecting with the outer peripheral surface 118, that is, the +β direction. The bottom surface of the base end portion 139b in the −β direction and the first surface 201 of the contact portion 200 are flat. The contact portion 200 comes into contact with the base end portion 139b of the wiper blade 139 and thus can support the base end portion 139b. The wiper blade 139 may have a shape in which the base end portion 139b is formed to have the same thickness as the blade portion 139c.

To support the wiper blade 139, a first support member 211a configured to be bent at a right angle toward the −γ direction and a second support member 211b configured to be bent at a right angle toward the +γ direction are fixed to the contact portion 200 by a plurality of first bolts 212a and a plurality of second bolts 212b. Specifically, the first support member 211a is provided on the upper surface of the contact portion 200 in the +γ direction and is fixed to the contact portion 200 by the plurality of first bolts 212a provided side by side in the width direction α of the transporting belt 117. An end portion of the base end portion 139b in the +γ direction is supported by the bent portion of the first support member 211a in the −β direction. That is, the end portion of the base end portion 139b in the +γ direction is interposed between the first surface 201 and the bent portion of the first support member 211a. This suppresses separation of the base end portion 139b and the contact portion 200.

Moreover, the second support member 211b is provided on the lower surface of the contact portion 200 in the −γ direction and is fixed to the contact portion 200 by the plurality of second bolts 212b provided side by side in the width direction α of the transporting belt 117. An end portion of the bent portion of the second support member 211b supports the constricted portion between the blade portion 139c and the base end portion 139b. Here, when the wiper blade 139 scrapes off the cleaning liquid Q and the like remaining on the lower surface portion 118c of the transporting belt 117, a pressing force is applied to the tip portion 139a in the −Y direction. The end portion of the bent portion of the second support member 211b supports the lower surface of the blade portion 139c in the −γ direction, so that the tip portion 139a is suitably in contact with the lower surface portion 118c of the transporting belt 117 while excessive deformation of the tip portion 139a is suppressed.

The contact portion 200 is provided with a plurality of holes 207 extending in the γ direction intersecting with the support face 232a. For example, the plurality of holes 207 are provided in the contact portion 200 side by side in the width direction α of the transporting belt 117. The dimensions of the holes 207 will be described below in detail. A screw 221 is inserted into each hole 207. The screw 221 includes a shaft portion 222 provided with a spiral groove 222a, and a head portion 223 having outer dimensions larger than the outer dimensions of the shaft portion 222. The support face portion 232 of the support portion 231 is provided with screw holes 234 that extend in a direction intersecting with the support face 232a, each screw hole 234 being screwed with the spiral groove 222a of the shaft portion 222. When the screws 221 are screwed into the respective screw holes 234, the contact portion 200 is fixed in the γ direction.

A plurality of pressing units 240 come into contact with the third surface 203 of the contact portion 200. The plurality of pressing units 240 press the base end portion 139b of the single wiper blade 139 via the contact portion 200. In the present embodiment, the pressing units 240 are, for example, second screws 241. For example, the plurality of second screws 241 are provided at the contact portion 200 side by side in the width direction α of the transporting belt 117. Hereinafter, the number of the screws 221 is equal to the number of the second screws 241. The plurality of screws 221 are provided at substantially the same position in the β direction, and the plurality of second screws 241 are also provided at substantially the same position in the β direction. In addition, the positions of the plurality of screws 221 in the α direction substantially coincide with the positions of the plurality of second screws 241 in the α direction. Each second screw 241 includes a second shaft portion 243 provided with a second spiral groove 243a, and a second head portion 242 having outer dimensions larger than the outer dimensions of the second shaft portion 243. The upright portion 233 of the support portion 231 is provided with second screw holes 235, each second screw hole 235 being screwed with the second spiral groove 243a of the second shaft portion 243. As illustrated in FIG. 6, the second screws 241 are screwed into the respective second screw holes 235 and are moved in the +β direction, and thus the second head portion 242 comes into contact with the third surface 203 of the contact portion 200. Further, the second screws 241 can more strongly press the base end portion 139b via the contact portion 200 as the second screws 241 are further moved in the +β direction. The shape of the contact portion 200 change more largely as the contact portion 200 is pressed by the second screws 241 more strongly. As the second screws 241 are further moved in the +β direction, it is possible to increase the pressing amount of pressing the base end portion 139b via the contact portion 200.

Figure 7:
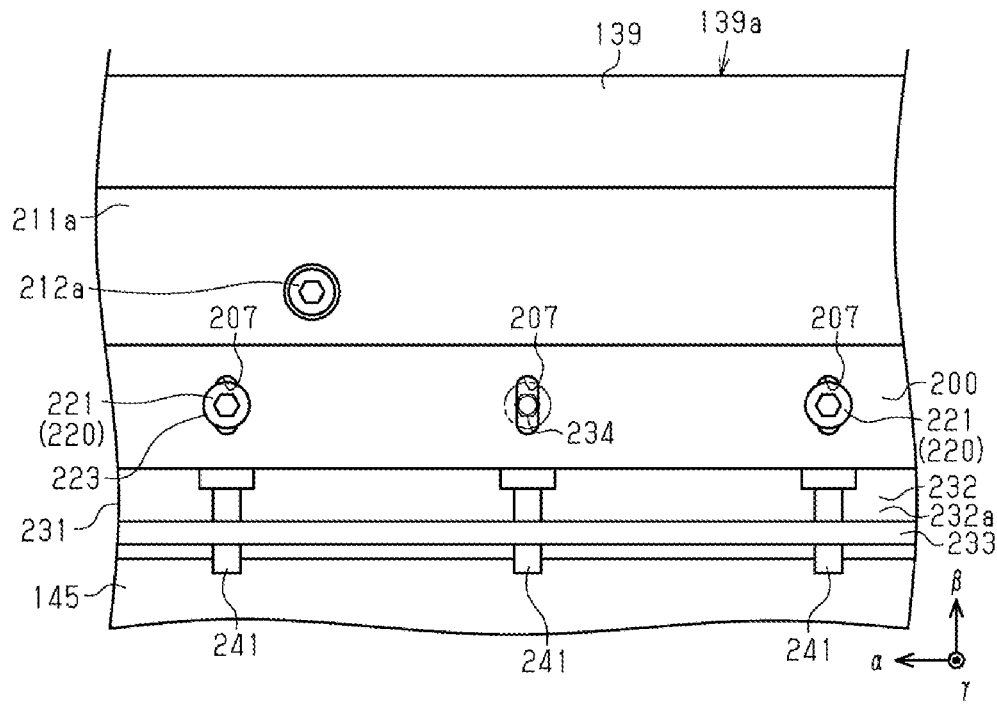
FIG. 7 is a front view illustrating a shape of a hole.

As illustrated in FIG. 7, a dimension of the hole 207 in the width direction α when the α-β plane is viewed in plan view from the γ direction intersecting with the support face 232a is equal to or larger than an outer dimension of the shaft portion 222 and smaller than an outer dimension of the head portion 223. Consequently, when the screws 221 are screwed into the respective screw holes 234, the head portions 223 press the contact portion 200 in the −γ direction, and the contact portion 200 is fixed to the support portion 231. Further, a dimension of the hole 207 in the blade extending direction β when the α-β plane is viewed in plan view from the γ direction intersecting with the support face 232a is configured such that the screw 221 can be screwed into the screw hole 234 even when the second screw 241 presses the contact portion 200 and the contact portion 200 is displaced. The contact portion 200 is displaceable within a range of the dimension of the hole 207 in the blade extending direction β.

The plurality of screws 221 are screwed into the respective screw holes 234 so that the head portions 223 press the contact portion 200 in the −γ direction. Thus, the state of the contact portion 200 is switched from a first state in which the contact portion 200 is displaced by being pressed by the plurality of second screws 241 to a second state in which the displacement of the contact portion 200 is more restricted than in the first state. Further, moving the head portions 223 of the screws 221 in the +γ direction further than in the second state switches the state of the contact portion 200 from the second state to the first state. That is, the state of the contact portion 200 can be switched from one of the first state and the second state to the other according to the degree of screwing of the screws 221 into the respective screw holes 234. In this regard, in the present embodiment, the screws 221, the holes 207, and the screw holes 234 constitute switching units 220 capable of switching the state of the contact portion 200 from one of the first state and the second state to the other.

Figure 8:
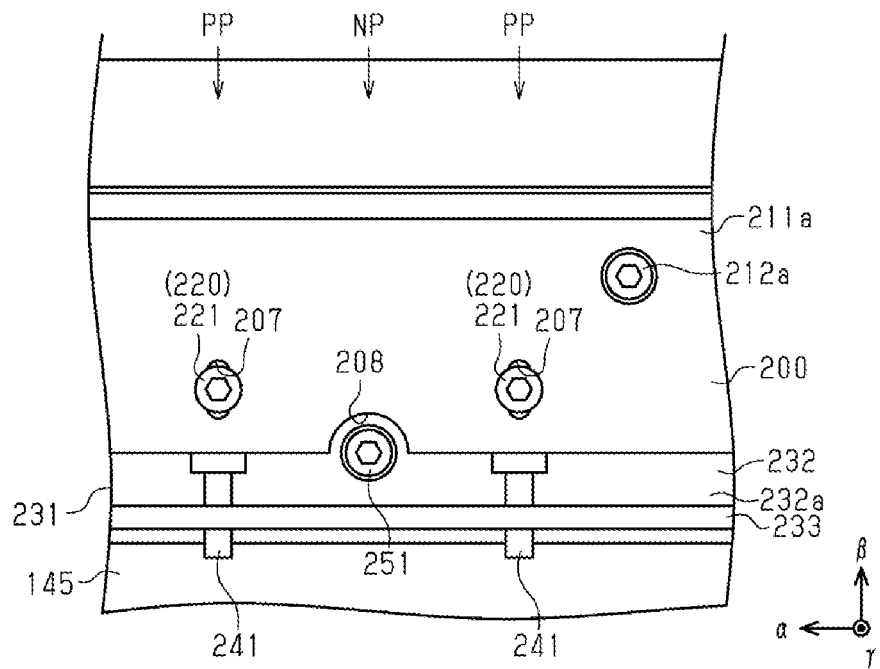
FIG. 8 is a front view illustrating a shape of a cutout portion.

As illustrated in FIG. 8, the support portion 231 is fixed to the second plate member 145 by a plurality of support bolts 251. The plurality of support bolts 251 are arranged side by side in the width direction α of the transporting belt 117. Further, the support bolts 251 are provided between the plurality of second screws 241. The contact portion 200 is provided with cutout portions 208 at positions where the respective support bolts 251 are provided. That is, the cutout portions 208 are provided between the plurality of second screws 241. The cutout portions 208 are recessed portions recessed in the +β direction more than the third surface 203 when the α-β plane is viewed in plan view from the γ direction. Thus, a maintenance person of the printing apparatus 100 can fasten or loosen the support bolts 251 without interfering with the contact portion 200.

In addition, as illustrated in FIG. 8, in the following description, a plurality of positions of the contact portion 200 pressed by the plurality of second screws 241 are defined as a plurality of pressed positions PP. Positions of the contact portion 200 between the plurality of pressed positions PP are defined as non-pressed positions NP. As described above, the cutout portions 208 are provided between the plurality of second screws 241. Thus, the non-pressed positions NP are positions where the respective cutout portions 208 are provided. At the non-pressed position NP where each cutout portion 208 is provided, the volume of the contact portion 200 is smaller than the volume of the contact portion 200 at other positions. Consequently, the rigidity of the contact portion 200 at each non-pressed position NP is smaller than the rigidity of the contact portion 200 at each pressed position PP. The hole 207 is provided at each pressed position PP of the contact portion 200, and the cutout portion 208 at each non-pressed position NP has substantially the same dimension in the blade extending direction β and a longer dimension in the width direction α than the hole 207. Thus, the rigidity of the contact portion 200 at each non-pressed position NP is smaller than the rigidity of the contact portion 200 at each pressed position PP due to a difference in spatial volume between the hole 207 and the cutout portion 208.

Action and Effect of Embodiment

An action and an effect of the embodiment will be described.

The transport device 116 and the printing apparatus 100 as an example of a liquid ejecting device according to the embodiment achieve the following action and effect.

(1) The printing apparatus 100 includes the transporting belt 117, the wiper blade 139, the contact portion 200, and the second screws 241 as the pressing units 240. The transporting belt 117 transports the medium M and includes the outer peripheral surface 118 where the medium M is placeable. The wiper blade 139 includes the tip portion 139a capable of being in contact with the outer peripheral surface 118 and the base end portion 139b on the opposite side of the tip portion 139a in an intersecting direction intersecting with the outer peripheral surface 118. The wiper blade 139 wipes the outer peripheral surface 118. The contact portion 200 is made of resin and can support the base end portion 139b by coming into contact with the base end portion 139b. The plurality of pressing units 240 can press the base end portion 139b via the contact portion 200, and are provided side by side in the width direction α of the transporting belt 117. Thus, according to the present disclosure, the height of each part of the wiper blade 139 can be more finely adjusted than in a case where the height of the entire wiper blade 139 is adjusted. This makes it possible to reduce the time and effort required for a maintenance person to adjust the printing apparatus 100. Further, the plurality of pressing units 240 press the base end portion 139b via the contact portion 200 made of resin. Thus, it is possible to suppress an excessive pressing force exerted by the second screws 241 on the wiper blade 139, compared to a case where the plurality of pressing units 240 directly press the base end portion 139b. Consequently, it is possible to provide a margin in the accuracy of the height adjustment of the wiper blade 139. Further, the plurality of pressing units 240 are provided side by side in the width direction α of the transporting belt 117. Thus, the pressing amount of the wiper blade 139 can be adjusted at a plurality of different positions in the width direction. Thus, the wiper blade 139 can be suitably in contact with the outer peripheral surface 118 over the entire region in the width direction α.

(2) The printing apparatus 100 further includes the plurality of switching units 220. The plurality of switching units 220 can perform switching from one of the first state and the second state to the other, the first state being a state in which the contact portion 200 is displaced by being pressed by the plurality of pressing units 240, the second state being a state in which the displacement is more restricted than in the first state. Thus, the maintenance person switches, by using the switching units 220, the contact portion 200 to the first state in which the contact portion 200 can be easily displaced, and thus can easily adjust the pressing amount of the wiper blade 139. In addition, after the adjustment of the wiper blade 139, the maintenance person switches, by using the switching unit 220, the contact portion 200 to the second state in which the contact portion 200 is not easily displaced, and thus can hold the wiper blade 139 with the adjusted pressing amount. Thus, the switching units 220 can reduce the time and effort required for the adjustment by the maintenance person.

(3) The printing apparatus 100 includes the support portion 231 including the support face 232a that supports the contact portion 200 in a displaceable manner. Each switching unit 220 includes the screw 221 including the shaft portion 222 provided with the spiral groove 222a, and the head portion 223 having an outer dimension larger than the outer dimension of the shaft portion 222. The support portion 231 is provided with the screw holes 234 extending in a direction intersecting with the support face 232a, each screw hole 234 being screwed with the spiral groove 222a of the shaft portion 222. The contact portion 200 is provided with the holes 207 extending in the direction intersecting with the support face 232a, the dimension of each hole in the width direction α when viewed in plan view from the direction intersecting with the support face 232a is equal to or larger than the outer dimension of the shaft portion 222 and smaller than the outer dimension of the head portion 223. Thus, since the dimension of the head portion 223 of the screw 221 is larger than the dimension of the hole 207 of the contact portion 200, the contact portion 200 can be switched from the first state to the second state by rotating the screws 221 in the fastening direction. Further, when the screws 221 are rotated in the loosening direction, the contact portion 200 can be switched from the second state to the first state. Thus, the switching units 220 can be easily configured by the screws 221.

(4) The printing apparatus 100 includes the support portion 231 including the support face 232a that supports the contact portion 200 in a displaceable manner. Each pressing unit 240 includes the second screw 241 including the second shaft portion 243 provided with the second spiral groove 243a, and the second head portion 242 having an outer dimension larger than the outer dimension of the second shaft portion 243. The support portion 231 includes the upright portion 233 extending in a direction intersecting with the support face 232a. The upright portion 233 includes the second screw holes 235, each second screw hole 235 being screwed with the second spiral groove 243a of the second shaft portion 243. Thus, by rotating the second screws 241 in the fastening direction with respect to the support portion 231 and pressing the base end portion 139b via the contact portion 200, it is possible to adjust the height at a corresponding position in the width direction α of the wiper blade 139. Thus, the pressing units 240 can be easily configured by the second screws 241.

(5) When the plurality of positions of the contact portion 200 pressed by the plurality of pressing units 240 are defined as the plurality of pressed positions PP, and the positions between the plurality of pressed positions PP are defined as the non-pressed positions NP, the rigidity of the contact portion 200 at each non-pressed position NP is smaller than the rigidity of the contact portion 200 at each pressed position PP. The contact portion 200 is provided with the cutout portions 208 at positions where the respective support bolts 251 are provided. That is, the cutout portions 208 are provided between the plurality of second screws 241. Thus, the non-pressed positions NP are positions where the respective cutout portions 208 are provided. At the non-pressed position NP where each cutout portion 208 is provided, the volume of the contact portion 200 is smaller than the volume of the contact portion 200 at other positions. Consequently, when the pressed positions PP are pressed by the second screws 241, the contact portion 200 is easily elastically deformed, and the contact portion 200 can be suitably displaced. For example, when the maintenance person operates the pressing units 240 to displace the pressed positions PP of the contact portion 200, the low-rigid portions at the non-pressed positions NP, which are located adjacent to the pressed positions PP, can be easily displaced along with the pressed positions PP. Thus, the heights of not only the portions at the pressed positions PP but also the portions at the non-pressed positions NP can be adjusted together, and thus the maintenance person can appropriately adjust the height of the wiper blade 139. For example, it is possible to reduce waving of the tip portion 139a of the wiper blade 139 in the width direction α caused when the heights of the portions at the pressed positions PP are adjusted and the heights of the portions at the non-pressed positions NP are not adjusted.

Modified Example

Figure 9:
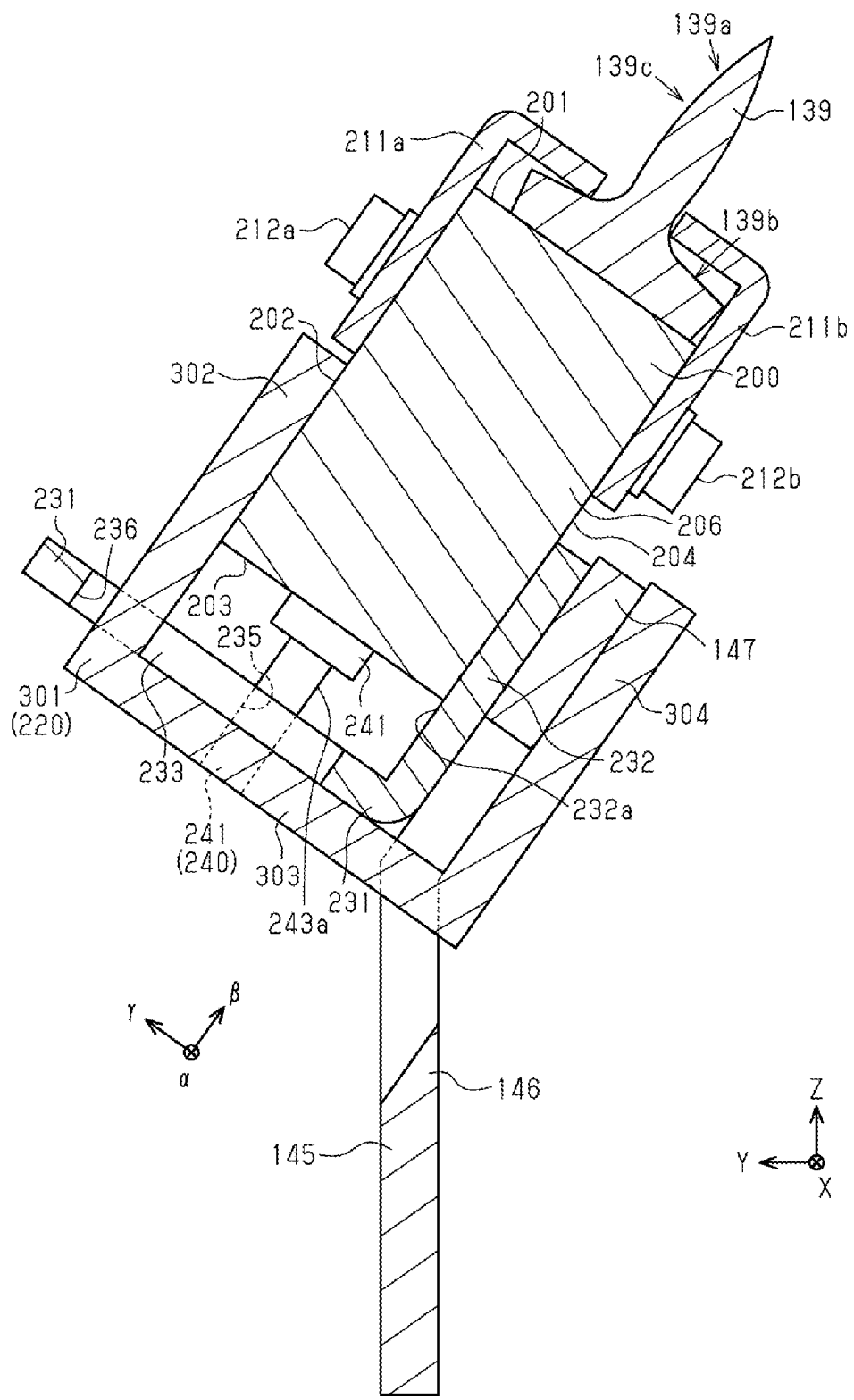
FIG. 9 is a side cross-sectional view illustrating a structure for supporting the wiper blade.

An alternative example of the above-described switching units will be described with reference to FIGS. 9 to 11. Configurations identical to those in the above embodiment will be denoted by the same reference signs and descriptions will be omitted.

In the printing apparatus 100 of the modified example, the switching units 220 may be a plurality of clip members 301 instead of (or in addition to) the plurality of screws 221.

Each clip member 301 is formed by, for example, folding a plate material into three. Specifically, the clip member 301 includes a first side plate portion 302, a bottom plate portion 303, and a second side plate portion 304. Due to the formation of the clip member 301, a pinching force is generated between the first side plate portion 302 and the second side plate portion 304, and thus an object provided between the first side plate portion 302 and the second side plate portion 304 is interposed.

The support portion 231 includes holes 236 that extend the upright portion 233 in the β direction. Each hole 236 is provided at a position where the center of the hole 236 substantially coincides with the second surface 202 of the contact portion 200 in the γ direction of the upright portion 233. The first portion 146 includes holes 148 that extend the first portion 146 in the β direction. Each hole 148 is provided at a position where the center of the hole 148 substantially coincides with the lower surface of the second portion 147 in the β direction of the first portion 146.

Figure 10:
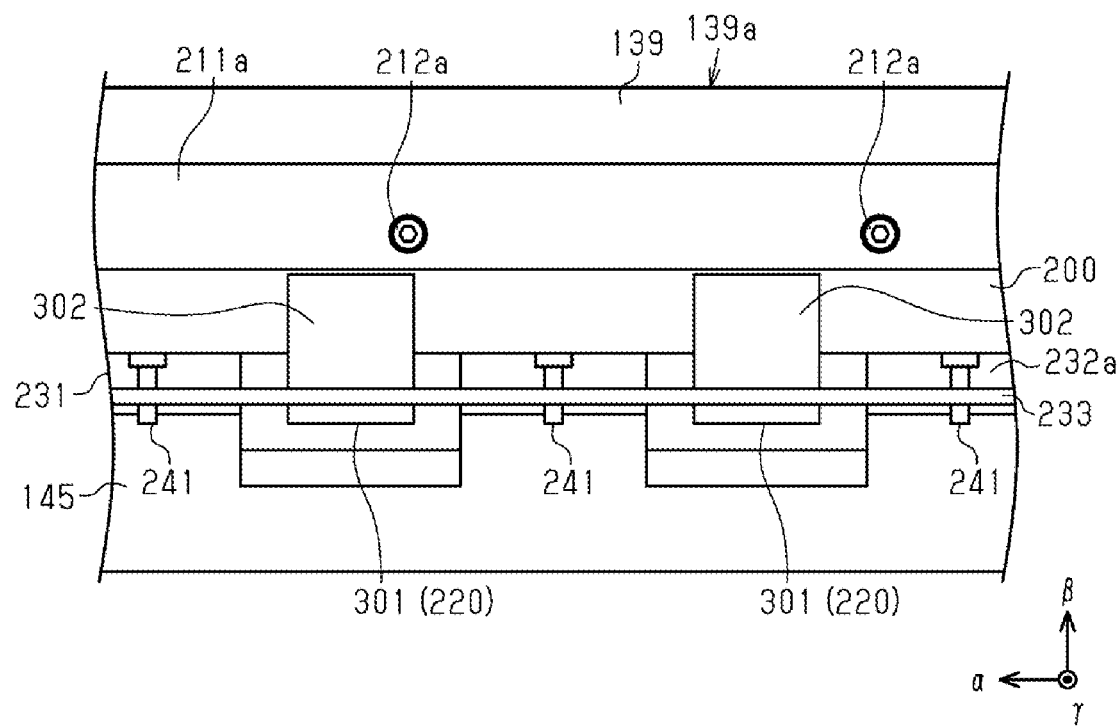
FIG. 10 is a top view illustrating a shape of a clip member.

As illustrated in FIG. 10, the first side plate portion 302 of the clip member 301 is positioned at the second surface 202 of the contact portion 200 in the +γ direction through the hole 236. The first side plate portion 302 covers at least a part of the contact portion 200 up to a point before the first support member 211a in the −β direction.

Figure 11:
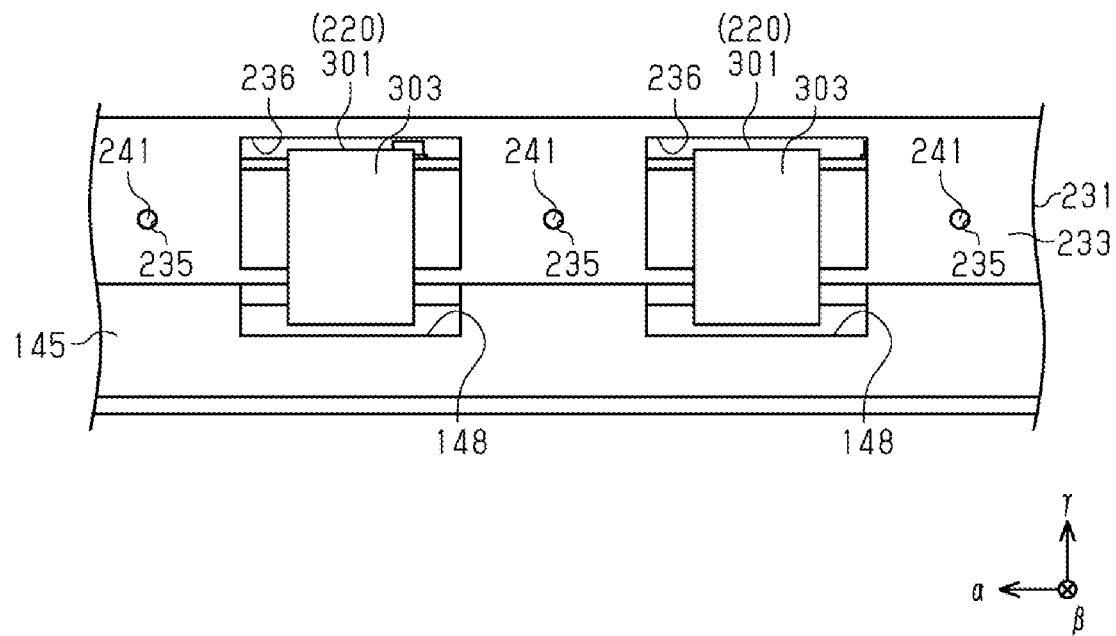
FIG. 11 is a front view illustrating the shape of the clip member.

As illustrated in FIG. 11, the second side plate portion 304 of the clip member 301 is positioned on the lower surface of the second portion 147 in the −γ direction in a state of being inserted into the hole 148. Thus, the clip member 301 interposes the contact portion 200 together with the second portion 147 and the support face portion 232 between the first side plate portion 302 and the second side plate portion 304. The clip member 301 is detachable so as to be brought into an interposing state in which the contact portion 200 is interposed with the contact portion 200 pressed against the support face 232a or a detaching state in which the contact portion is not interposed.

The plurality of clip members 301 are attached to and detached from the contact portion 200, so that switching can be performed from one of the first state and the second state to the other, the first state being a state in which the contact portion 200 is displaced by being pressed by the plurality of pressing units 240, the second state being a state in which the displacement is more restricted than in the first state. Thus, the clip members 301 switch the contact portion 200 to the first state in which the contact portion 200 is easily displaced, and thus can easily adjust the pressing amount of the wiper blade 139. In addition, after the adjustment of the wiper blade 139, the clip members 301 switch the contact portion 200 to the second state in which the contact portion 200 is not easily displaced, and thus can maintain the adjusted pressing amount of the wiper blade 139. Thus, the maintenance person switches, by using the clip members 301 as the switching units 220, the contact portion 200 to the first state in which the contact portion 200 is easily displaced, and thus can easily adjust the pressing amount of the wiper blade 139. After the adjustment of the wiper blade 139, the maintenance person switches, by using the clip members 301 as the switching units 220, the contact portion 200 to the second state in which the contact portion 200 is not easily displaced, and thus can hold the wiper blade 139 with the adjusted pressing amount. Thus, it is possible to reduce the time and effort required for the adjustment by the maintenance person.

The embodiment described above may be modified and implemented as follows. The embodiment and modified examples thereof to be described below may be implemented in combination within a range in which a technical contradiction does not arise.

The pressing units 240 may be implemented by cams instead of (or in addition to) the second screws 241.

The contact portion 200 is only required to be made of resin and may be made of synthetic resin (plastic) including synthetic rubber or the like or natural resin including natural rubber or the like.

The number of the second screws 241 and the number of the screws 221 are only required to be plural and may be the same as or different from each other.

In a case where a washer is provided between the screw 221 and the contact portion 200, the hole 207 may have any shape as long as the outer dimensions are equal to or larger than the outer dimensions of the shaft portion 222 and smaller than the outer dimensions of the washer.

The switching units may be configured by components other than the screws 221 and the clip members 301 as long as the state of the contact portion 200 can be switched between the first state and the second state.

A case has been described in which the rigidity of the contact portion 200 at each non-pressed position NP is smaller than the rigidity of the contact portion 200 at each pressed position PP because the contact portion 200 is provided with the cutout portions 208, but the present disclosure is not limited thereto. The contact portion 200 at each non-pressed position NP may be formed to be thinner in the β direction than the contact portion 200 at each pressed position PP. Thus, the rigidity of the contact portion 200 at each non-pressed position NP is smaller than the rigidity of each contact portion 200 at the pressed position PP.

The cutout portions 208 may be provided at all positions between the pressed positions PP.

Hereinafter, technical concepts and effects thereof that are understood from the above-described embodiments and modified examples will be described.

(A) A transport device includes a transporting belt including an outer peripheral surface where a medium is placeable, the transporting belt being configured to transport the medium, a wiper blade including a tip portion configured to come into contact with the outer peripheral surface, and a base end portion located on an opposite side of the tip portion in an intersecting direction intersecting with the outer peripheral surface, the wiper blade being configured to wipe the outer peripheral surface, a contact portion made of resin and configured to support the base end portion by coming into contact with the base end portion, and a plurality of pressing units provided side by side in a width direction of the transporting belt, the plurality of pressing units being configured to press the base end portion via the contact portion.

According to this configuration, it is possible to more finely adjust the height of each portion of the wiper blade than in a case where the height of the entire wiper blade is adjusted. In addition, the plurality of pressing units press the base end portion via the contact portion made of resin, and thus it is possible to suppress an excessive pressing force exerted by the pressing units on the wiper blade, compared to a case where the plurality of pressing units directly press the base end portion. In addition, the plurality of pressing units are provided side by side in the width direction of the transporting belt, and thus it is possible to adjust the pressing amount of the wiper blade at a plurality of different positions in the width direction. As a result, the wiper blade can be suitably in contact with the outer peripheral surface over the entire region in the width direction.

(B) The transport device may further include a plurality of switching units configured to perform switching from one of a first state and a second state to the other, the first state being a state in which the contact portion is displaced by being pressed by the plurality of pressing units, the second state being a state in which the displacement is more restricted than in the first state.

According to this configuration, the maintenance person switches, by using the switching units, the contact portion to the first state in which the contact portion is easily displaced, and thus can easily adjust the pressing amount of the wiper blade. In addition, after the adjustment of the wiper blade, the maintenance person switches, by using the switching units, the contact portion to the second state in which the contact portion is not easily displaced, and thus can hold the wiper blade with the adjusted pressing amount. Thus, it is possible to reduce the time and effort required for the adjustment by the maintenance person.

(C) The transport device may include a support portion including a support face configured to support the contact portion in a displaceable manner, wherein the plurality of switching units may include a screw including a shaft portion provided with a spiral groove, and a head portion having an outer dimension larger than an outer dimension of the shaft portion, the support portion may be provided with screw holes extending in a direction intersecting with the support face, each of the screw holes being screwed with the spiral groove of the shaft portion, and the contact portion may be provided with holes extending in the direction intersecting with the support face, and a dimension of each of the holes in the width direction when viewed in plan view from the direction intersecting with the support face is equal to or larger than the outer dimension of the shaft portion and smaller than the outer dimension of the head portion.

According to this configuration, the dimension of the head portion of the screw is larger than the dimension of the hole of the contact portion, and thus the contact portion can be switched from the first state to the second state by rotating the screws in the fastening direction, and the contact portion can be switched from the second state to the first state by rotating the screws in the loosening direction. Thus, the switching units can be easily configured by the screws.

(D) The transport device may include a support portion including a support face configured to support the contact portion in a displaceable manner, wherein each of the plurality of pressing units may include a second screw including a second shaft portion provided with a second spiral groove, and a second head portion having an outer dimension larger than an outer dimension of the second shaft portion, and the support portion may be provided with an upright portion extending in a direction intersecting with the support face, and the upright portion may be provided with a second screw hole screwed with the second spiral groove of the second shaft portion.

According to this configuration, it is possible to adjust the height of the wiper blade at the corresponding position in the width direction by rotating the second screws in the fastening direction with respect to the upright portion and pressing the base end portion via the contact portion. Thus, the pressing units can be easily configured by the second screws.

(E) In the transport device, when, in the contact portion, a plurality of positions pressed by the plurality of pressing units are defined as a plurality of pressed positions, and a position between the plurality of pressed positions is defined as a non-pressed position, rigidity of the contact portion at the non-pressed position may be smaller than rigidity of the contact portion at the pressed positions.

According to this configuration, when a pressed portion is pressed at one of the pressed positions where a non-pressed portion decreasing the rigidity of the contact portion is present between this pressed position and an adjacent pressed position, the contact portion can be suitably displaced at this pressed position. Thus, the height of the wiper blade can be easily adjusted.

(F) A liquid ejecting device includes an ejecting unit configured to eject a liquid to a medium, a transporting belt including an outer peripheral surface where a medium is placeable, the transporting belt being configured to transport the medium, a wiper blade including a tip portion configured to come into contact with the outer peripheral surface, and a base end portion located on an opposite side of the tip portion in an intersecting direction intersecting with the outer peripheral surface, the wiper blade being configured to wipe the outer peripheral surface, a contact portion made of resin and configured to support the base end portion by coming into contact with the base end portion, and a plurality of pressing units provided side by side in a width direction of the transporting belt, the plurality of pressing units being configured to press the base end portion via the contact portion.

According to this configuration, it is possible to more finely adjust the height of each portion of the wiper blade than in a case where the height of the entire wiper blade is adjusted. In addition, the plurality of pressing units press the base end portion via the contact portion made of resin, and thus it is possible to suppress an excessive pressing force exerted by the pressing units on the wiper blade, compared to a case where the plurality of pressing units directly press the base end portion. In addition, the plurality of pressing units are provided side by side in the width direction of the transporting belt, and thus it is possible to adjust the pressing amount of the wiper blade at a plurality of different positions in the width direction. As a result, the wiper blade can be suitably in contact with the outer peripheral surface over the entire region in the width direction.

(G) The liquid ejecting device may further include a plurality of switching units configured to perform switching from one of a first state and a second state to the other, the first state being a state in which the contact portion is displaced by being pressed by the plurality of pressing units, the second state being a state in which the displacement is more restricted than in the first state.

According to this configuration, the maintenance person switches, by using the switching units, the contact portion to the first state in which the contact portion is easily displaced, and thus can easily adjust the pressing amount of the wiper blade. In addition, after the adjustment of the wiper blade, the maintenance person switches, by using the switching units, the contact portion to the second state in which the contact portion is not easily displaced, and thus can hold the wiper blade with the adjusted pressing amount. Thus, it is possible to reduce the time and effort required for the adjustment by the maintenance person.

What is claimed is:

1. A transport device comprising:
    a transporting belt including an outer peripheral surface where a medium is placeable, the transporting belt being configured to transport the medium;
    a wiper blade including a tip portion configured to come into contact with the outer peripheral surface, and a base end portion located on an opposite side of the tip portion in an intersecting direction intersecting with the outer peripheral surface, the wiper blade being configured to wipe the outer peripheral surface;
    a contact portion made of resin and configured to support the base end portion by coming into contact with the base end portion; and
    a plurality of pressing units provided side by side in a width direction of the transporting belt, the plurality of pressing units being configured to press the base end portion via the contact portion.

2. The transport device according to claim 1, further comprising:
    a plurality of switching units configured to perform switching from one of a first state and a second state to the other, the first state being a state in which the contact portion is displaced by being pressed by the plurality of pressing units, the second state being a state in which the displacement is more restricted than in the first state.

3. The transport device according to claim 2, comprising:
    a support portion including a support face configured to support the contact portion in a displaceable manner, wherein
    the plurality of switching units include a screw including a shaft portion provided with a spiral groove, and a head portion having an outer dimension larger than an outer dimension of the shaft portion,
    the support portion is provided with a screw hole extending in a direction intersecting with the support face, the screw hole being screwed with the spiral groove of the shaft portion, and
    the contact portion is provided with a hole extending in the direction intersecting with the support face, and a dimension of the hole in the width direction when viewed in plan view from the direction intersecting with the support face is equal to or larger than the outer dimension of the shaft portion and smaller than the outer dimension of the head portion.

4. The transport device according to claim 1, comprising:
    a support portion including a support face configured to support the contact portion in a displaceable manner, wherein
    the plurality of pressing units include a second screw including a second shaft portion provided with a second spiral groove, and a second head portion having an outer dimension larger than an outer dimension of the second shaft portion, and
    the support portion is provided with an upright portion extending in a direction intersecting with the support face, and
    the upright portion is provided with a second screw hole screwed with the second spiral groove of the second shaft portion.

5. The transport device according to claim 1, wherein
    when, in the contact portion, a plurality of positions pressed by the plurality of pressing units are defined as a plurality of pressed positions, and a position between the plurality of pressed positions is defined as a non-pressed position, rigidity of the contact portion at the non-pressed position is smaller than rigidity of the contact portion at the pressed positions.

6. A liquid ejecting device comprising:
    an ejecting unit configured to eject a liquid to a medium;
    a transporting belt including an outer peripheral surface where a medium is placeable, the transporting belt being configured to transport the medium;
    a wiper blade including a tip portion configured to come into contact with the outer peripheral surface, and a base end portion located on an opposite side of the tip portion in an intersecting direction intersecting with the outer peripheral surface, the wiper blade being configured to wipe the outer peripheral surface;

a contact portion made of resin and configured to support the base end portion by coming into contact with the base end portion; and a plurality of pressing units provided side by side in a width direction of the transporting belt, the plurality of pressing units being configured to press the base end portion via the contact portion.

7. The liquid ejecting device according to claim 6, further comprising:

a plurality of switching units configured to perform switching from one of a first state and a second state to the other, the first state being a state in which the contact portion is displaced by being pressed by the plurality of pressing units, the second state being a state in which the displacement is more restricted than in the first state.

* * * * *